(12) United States Patent
Faulkner et al.

(10) Patent No.: US 11,264,153 B2
(45) Date of Patent: Mar. 1, 2022

(54) ELECTRICAL ISOLATOR

(71) Applicant: Crompton Technology Group Limited, Solihull (GB)

(72) Inventors: Dale Faulkner, Stourbridge (GB); James William Bernard, Brackley (GB); Jon Pethick, Leicestershire (GB); Paul Peacock, Banbury (GB); Ioannis Giannakopoulos, London (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 33 days.

(21) Appl. No.: 16/717,775

(22) Filed: Dec. 17, 2019

(65) Prior Publication Data
US 2020/0321148 A1 Oct. 8, 2020

(30) Foreign Application Priority Data
Apr. 2, 2019 (EP) .................................. 19386021

(51) Int. Cl.
*H01B 17/56* (2006.01)
*H01B 19/00* (2006.01)
(52) U.S. Cl.
CPC .............. *H01B 17/56* (2013.01); *H01B 19/00* (2013.01)
(58) Field of Classification Search
CPC ........ H01B 17/56; H01B 19/00; H01B 17/58; F16L 25/009; F16L 25/01; F16L 25/02; F16L 25/021; F16L 25/023; F16L 25/025; F16L 25/03; B64D 37/32; H02G 3/24; H02G 3/26; H02G 3/28; H02G 3/30;
(Continued)

(56) References Cited

U.S. PATENT DOCUMENTS 3,462,175 A * 8/1969 Johnson ................ F16L 21/005
285/113
4,011,652 A 3/1977 Black
(Continued)

FOREIGN PATENT DOCUMENTS

EP 3153756 A1 4/2017
WO 2009087372 A2 7/2009

OTHER PUBLICATIONS

Extended European Search Report for International Application No. 19386021.0 dated Oct. 10, 2019, 9 pages.
(Continued)

*Primary Examiner* — Angel R Estrada
(74) *Attorney, Agent, or Firm* — Cantor Colburn LLP

(57) ABSTRACT

An electrical isolator comprising: a first fluid-carrying member and a second fluid-carrying member spaced apart from said first fluid-carrying member; wherein said first fluid-carrying member has a first toothed surface and said second fluid-carrying member has a second toothed surface; wherein the electrical isolator further comprises: a fibre-reinforced polymer tube that overlaps both the first fluid-carrying member and the second fluid-carrying member and which contacts the first toothed surface in a first interface region of the fibre-reinforced polymer tube and which contacts the second toothed surface in a second interface region of the fibre-reinforced polymer tube; and a compression fitting arranged to bias the first interface region and the first toothed surface together.

15 Claims, 6 Drawing Sheets

(58) Field of Classification Search
CPC ........ H02G 3/34; H02G 3/383; H02G 15/007; H02G 15/013; H02G 15/00
USPC ...... 174/138 R, 137, 68.1, 68.3, 72 A, 70 C, 174/88 R, 95, 73.1; 248/49, 68.1; 285/45, 47, 48, 53, 294.2
See application file for complete search history.

(56) References Cited

U.S. PATENT DOCUMENTS

| | | | | |
|---|---|---|---|---|
| 4,099,021 | A | * | 7/1978 | Venezia ................. H02G 15/10 174/73.1 |
| 4,314,093 | A | * | 2/1982 | Eldridge .............. H02G 15/184 174/73.1 |
| 4,383,131 | A | * | 5/1983 | Clabburn ............... H02G 15/10 174/73.1 |
| 4,398,754 | A | | 8/1983 | Caroleo et al. |
| 5,114,190 | A | | 5/1992 | Chalmers |
| 5,131,688 | A | | 7/1992 | Tricini |
| 7,686,344 | B2 | | 3/2010 | Fernandez Vieira |
| 8,476,526 | B2 | * | 7/2013 | Lichy ................... H02G 15/184 174/73.1 |
| 9,556,986 | B2 | * | 1/2017 | Mueller ................. F16L 25/03 |
| 9,618,148 | B2 | | 4/2017 | Breay et al. |

OTHER PUBLICATIONS

EPO Official Letter for Application No. 19386021.0 dated Nov. 10, 2021, 6 pages.

* cited by examiner

ELECTRICAL ISOLATOR

FOREIGN PRIORITY

This application claims priority to European Patent Application No. 19386021.0 filed Apr. 2, 2019, the entire contents of which is incorporated herein by reference.

TECHNICAL FIELD

The present disclosure relates generally to an electrical isolator, and more specifically to an electrical isolator for use in a hydraulic fluid line for an aircraft. The electrical isolator may be used for connecting two fluid-carrying members such as pipes, hoses or tubes, for example pipes conveying hydraulic fluid.

BACKGROUND

Aircraft and other vehicles contain a large number of fluid conveying systems, in particular hydraulic systems that comprise fluid conveying components such as pipes. Such components are typically metallic and have good electrical conductivity.

Devices are incorporated into such systems to form electrical isolators between the metallic components. These isolators prevent build-up of electrostatic charge by safely dissipating static build up, and also prevent excessive electrical current flowing through the system, for example due to a lightning strike. Both of these events could cause a fire hazard if such isolators were not present in the system.

When incorporated into a fluid conveying system, the electrical isolator also needs to act as a safe passage for fluid. In certain systems, for example hydraulic systems or hydraulic fluid lines in an aircraft, the isolator needs to be able to withstand high pressures, in addition to other load and environmental factors.

The present disclosure is aimed at balancing the above factors to provide an electrical isolation function within a pressurised fluid system.

EP 3153756 describes such an electrical isolator in which a reinforcing composite is provided over the top of a resistive component. The reinforcing composite is made partially conductive by adding a conductive additive to the resin so as to control the conductivity across the electrical isolator such that it can dissipate static build up while not being a primary conduction path in the event of a lightning strike.

SUMMARY

According to this disclosure, there is provided an electrical isolator. The isolator includes a first fluid-carrying member and a second fluid-carrying member spaced apart from said first fluid-carrying member. The first fluid-carrying member has a first toothed surface and said second fluid-carrying member has a second toothed surface, The electrical isolator further comprises: a fibre-reinforced polymer tube that overlaps both the first fluid-carrying member and the second fluid-carrying member and which contacts the first toothed surface in a first interface region of the fibre-reinforced polymer tube and which contacts the second toothed surface in a second interface region of the fibre-reinforced polymer tube; and a compression fitting arranged to bias the first interface region and the first toothed surface together.

Conventional electrical isolators for hydraulic systems or fuel systems require complex multi-part unidirectional seals to prevent leakage of the fluid which, in the case of hydraulic systems, can be at very high pressures, e.g. above 1,000 psi. In some examples, the operating pressure may be at least 2,000 psi, e.g. in the region of 2,000 to 5,000 psi, and in some cases over 30,000 psi. Such seals are expensive as well as being difficult, complicated and time-consuming to assemble. According to this disclosure, an electrical isolator can be made without the need for such complicated multi-part seals. By mating the fibre-reinforced polymer tube with the first and second fluid-carrying members by a toothed interface the two parts of which are biased together by means of the compression fitting, the fluid-carrying members and the fibre-reinforced polymer tube are brought into sufficiently firm contact that a good seal is made and maintained, thus preventing leakage of the fluid during use. Moreover, the fibre-reinforced polymer tube can be used to provide the required electrical resistance that is necessary in an electrical isolator such that the conduit as a whole does not serve as a primary conduction path, e.g. in the event of a lightning strike.

It should be noted that the compression fitting is required to provide sufficient preload to the two surfaces which form the seal. During use, the pressure of the fluid passing through the system can vary greatly, particularly in a hydraulic system where the fluid is repeatedly pressurised and de-pressurised. This constant change of pressure risks movement and thus fretting of adjacent surfaces of an interface, particularly a toothed interface. Such fretting would compromise the integrity of the seal and thus must be avoided. The compression fitting provides a preload to the toothed surface and the corresponding interface surface that ensures that no movement and thus no fretting occurs even under the high pressures and repeated pressure fluctuations that occur in hydraulic systems.

With such a sealing interface, the seal is effected in a straightforward manner with a reduced component count and with a simpler assembly process. Moreover, the fibre-reinforced polymer tube can be cut from existing, mass-produced wound tubes of fibre-reinforced polymer which are readily available.

It will be appreciated that in some examples a single compression fitting could be provided which extends across the length of the electrical isolator and serves to compress both the first toothed surface (against the first interface region) and the second toothed surface (against the second interface region) simultaneously. However, while such a compression fitting has the benefit of simplicity, it is longer than necessary and therefore increases weight. Therefore in some preferred examples the compression fitting is a first compression fitting and the electrical isolator further comprises a second compression fitting arranged to bias the second interface region and the second toothed surface together. With separate compression fittings, the weight of the product is reduced.

In the following, features are described only in relation to the first toothed surface and the first interface region. However, it will be appreciated that everything discussed in relation to the first toothed surface, first interface region and first compression fitting applies equally to the second toothed surface, second interface region and second compression fitting.

In this document, the terms "tooth" and "teeth" (and related terms such as "toothed surface") encompass both axial splines and helical threads of any angle. In low pressure systems the toothed surfaces could be axial splines.

In some examples, the toothed surface may comprise a plurality of teeth, each tooth formed as an axial spline engaging with the interface region. Such axial splines extend in a substantially straight line in a plane with the shaft axis (but may also have a radial component due to a taper as discussed further below). To engage the axial splines with the interface region, the fluid-carrying member is pressed axially onto the fibre-reinforced polymer tube (preferably with lubrication to facilitate the relative movement) so that the splines cut into the exposed surface of the fibre-reinforced polymer material.

The lubricant may be a liquid adhesive that reduces the coefficient of friction during assembly. The adhesive may additionally act to improve the seal of the joint by filling and sealing any gaps between the composite surface and the fluid-carrying member.

Such axial splines are only suitable in lower pressure systems as higher pressure systems produce axial forces that act in the direction of such splines meaning that the splines do not provide resistance to the separation of the two joined parts.

Therefore in other examples, the toothed surface may comprise at least one tooth formed as a helical thread engaging with the interface region. Preferably the first toothed surface and/or the second toothed surface is threaded. The helical thread (or plurality of helices in the case of a multi-start thread arrangement) extends substantially circumferentially adjacent to the interface region (although also with an axial component so as to form a helix). To engage the helical thread(s) with the interface region, the fluid-carrying member and the fire-reinforced polymer tube are rotated relative to one another so as to twist the fluid-carrying member onto the fibre-reinforced polymer tube. Preferably at the same time, an axial relative movement is induced at a rate of one thread pitch per full rotation. This helps to ensure that the thread cuts into the interface region in the right direction for the thread angle. Again, lubricant is preferably used to ease the joining process. The thread angle may be varied depending on the intended loading. A high angle (close to perpendicular to the tube axis) will be best for the axial loads generated by high pressure fluid systems. To maximise the strength of the joint in the axial direction (i.e. to resist the internal fluid pressure), it is desirable to make the thread is perpendicular as possible to the tube axis. This has the effect of increasing the amount of cutting required to fully screw the fluid-carrying member onto the tube.

The toothed surface may in some examples have a profile that comprises a cutting tooth portion arranged to cut into the corresponding interface region and a substantially flat land portion that frictionally engages with the interface region. A section taken substantially perpendicular to the direction of the teeth will preferably exhibit alternating teeth and lands.

The profile may further comprise at least one channel portion adjacent to the cutting tooth portion to accommodate debris produced during a mounting process. The channel portion may be provided between the tooth portion and the flat land portion.

A multi-start thread may be used on the fluid-carrying member, i.e. one with multiple adjacent helices interleaved with one another. However, in some preferred examples the thread is a single-start thread. The multi-start thread may have advantages in reducing the number of turns required to mount the fluid-carrying member onto the fibre-reinforced polymer tube, but it also requires a reduction in the angle between the threads and the tube axis (i.e. the threads must be less perpendicular to the tube axis) which, as discussed before diverges from the ideal, perpendicular arrangement for axial load resistance. Therefore such arrangements may be better suited where axial loads are not excessive, e.g. where fluid pressures are lower, such as in fuel systems.

The first toothed surface and the first interface region may both be parallel to the axis of the tube, i.e. such that both surfaces form a cylinder. Manufacturing of such surfaces is straightforward and inexpensive. However, in some examples, the first toothed surface and the first interface region are tapered. Additionally, or alternatively, the second toothed surface and the second interface region may be tapered.

Tapering the fibre-reinforced polymer tube and the fluid-carrying member means that the process for engaging the two together can be accomplished in less time and over a short distance. The taper allows a certain amount of axial overlap between the two parts before contact is made between the end fitting and the interface region of the shaft. When contact is made, it is made along substantially the whole of the interface region simultaneously. Further axial movement between the two parts results in further overlap of the two parts. Importantly, the taper on the fibre-reinforced polymer tube exposes a significant cross section of the tube to the fluid-carrying member and results in engagement with the fluid-carrying member across that exposed portion. This ensures that engagement is not simply with the outermost or innermost surface portion of the tube, reducing the chance of failure of the joint, e.g. by delamination when force is transmitted across the joint.

One problem with engaging a toothed surface with a composite tube is ensuring that the force applied across the joint is distributed throughout the material of the composite tube. For example, in the case of layered (multi-ply) fibre-reinforced polymer tubes such as composite filament-wound tubes, the problem lies in ensuring that the load transfer between the fluid-carrying members and the tube is distributed amongst all filament layers. The thickness of a composite filament-wound tube is typically built up from a number of layers of helically wound filaments. Attaching a fluid-carrying member to the tube by press-fitting parallel surfaces would result in the toothed surface of the fluid-carrying member interfacing only with the outermost plies of the tube. The load transfer between plies would then be reliant on the interlaminar shear strength of the laminate to distribute the load to adjacent plies, leading to a weaker joint. This interlaminar shear strength is in large part determined by the properties of the resin matrix in which the filaments are bound rather than being determined by the filaments themselves. By contrast, engaging a tapered interface region exposes several layers of fibres and the correspondingly tapered toothed surface can engage all of those layers, thus distributing the load throughout the thickness of the composite tube.

Additionally, when compared with parallel (non-tapered) joints in which the surfaces of the interface region and the toothed surface are parallel with the axis, the shorter engagement distance along which contact is required means that there is less heat build-up due to friction between the parts and less time is required to complete the joint (thus making assembly faster and more efficient).

In some preferred examples the fibre-reinforced polymer tube is a multi-layer filament tube and the tapered interface region exposes a plurality of layers of filaments to the toothed surface. For example a filament-wound tube may typically be formed by winding filaments around a mandrel in a helix (with varying helix angle, depending on application) back and forth so as to build up multiple plies (or layers) of filaments to the desired thickness. As described above, different layers may be formed with different helix angles to give different properties to the finished product. The wound filaments are normally coated in or soaked in resin so as to form a matrix of resin and filaments that is cured to solidify and form the final composite.

Tapering the interface region, e.g. by cutting or grinding or by any other material removal process to expose the filament ends ensures that all, or most layers of fibres (typically helical plies of fibres) that form the tube are engaged with the fluid-carrying member, thus ensuring excellent load sharing of forces between the fluid-carrying member and the fibre-reinforced polymer tube. Distributing the applied forces across more fibres, in particular across more fibre plies of the tube greatly increases the strength of the joint. During the mounting process, in some examples the teeth of the toothed surface are driven into the composite tube, between the fibre ends, compressing the fibres and thus forming a very strong attachment. As more of the teeth engage with the interface region the strength of the joint increases. The teeth may cut into and remove material from the composite shaft. In other examples one or more thread-receiving channels or spline-receiving channels may be machined (e.g. pre-cut) into the tube prior to fitting the fluid-carrying member. This has the advantage of reducing the assembly load and hence the layers of the tube can be optimised to suit the operational loads not the loads for assembly.

It will be appreciated that the direction of the taper will depend on the particular arrangement of the fluid-carrying member and the fibre-reinforced polymer tube. If the toothed surface is formed on the outer diameter of the fluid-carrying member (i.e. so that the teeth face radially outwardly and the fluid-carrying member is inserted inside the fibre-reinforced polymer tube) then the taper narrows radially towards the end of the fluid-carrying member. Otherwise, if the toothed surface is on the internal diameter of the fluid-carrying member (i.e. so that the teeth face radially inwardly and the fibre-reinforced tube is inserted inside the fluid-carrying member), then the taper widens radially towards the end of the fluid-carrying member. The tapers for the corresponding interface region are opposite such that the tapers match and can be located together easily.

If the taper is formed on the outside of the tube, i.e. so that the outer diameter of the tube reduces towards the end of the tube, this forms a convex partially conical end to the tube (not a complete cone, resulting in a frustoconical shaped end). The fluid-carrying member then has a concave cone shape (or frustoconical shape) that matches and engages therewith.

Alternatively, if the taper is formed on the inside of the tube, i.e. so that the inner diameter of the tube increases towards the end of the tube. This forms a concave partially conical end to the tube (not a complete cone, resulting in a concave frustoconical shaped end). The fluid-carrying member then has a convex cone shape (or frustoconical shape) that matches and engages therewith.

The angle of the taper may be selected according to the desired purpose of the electrical isolator, e.g. according to the expected fluid pressures that will pass through the isolator. However, generally a narrower angle of taper (with respect to the tube/pipe axis) will result in more frictional engagement which results in a stronger joint. In some preferred examples, the taper is at an angle to the tube axis of no more than 20 degrees, preferably no more than 15 degrees, more preferably no more than 10 degrees, more preferably still no more than 7 degrees.

The compression fitting may be formed from any suitable material, e.g. it may be a metal ring or plug or it may be a fibre-reinforced composite ring or plug. In preferred examples it is a metal ring, e.g. made from titanium as this provides the required strength and stiffness with minimal weight.

The compression fitting is typically fitted by press-fitting over the joint once the two surfaces (toothed surface and interface region) have been engaged. The compression fitting may be formed as a ring which forms an interference fit, e.g. by being slightly undersized (in the case of a compression fitting that is fitting radially outwardly of the two surfaces) or oversized (in the case of a compression fitting that is fitted radially inwardly of the two surfaces). Thus, as the compression fitting is forced into position, i.e. in line with the joint, it compresses the joint surfaces together so as to preload the joint, increasing friction at the joint interface and thereby preventing movement and possible fretting during use.

In some examples, the compression fitting is located radially inwardly of the first toothed surface. In such examples the compression fitting is a ring or plug that, when fitted, biases the innermost surface of the joint radially outwardly against the outermost surface of the joint. In such arrangements, the compression fitting is located within the fluid-carrying part of the electrical isolator and is therefore formed as a hollow cylinder so that fluid can flow through it. Further, as the compression fitting forms part of the inner surface of the fluid-carrying part of the isolator, it will affect the fluid flow. Therefore in some examples the compression fitting is a hollow cylinder arranged such that, when installed, its inner diameter is flush with the inner diameter of the first fluid-carrying member. This may be achieved by suitable shaping of the inner surface of the first fluid-carrying member, e.g. by forming a recess with a radial depth equal to the radial thickness of the compression fitting.

In other examples the compression fitting is located radially outwardly of the first toothed surface. In such examples the compression fitting is a ring that, when fitted, biases the outermost surface of the joint radially inwardly against the innermost surface of the joint. In such arrangements, the compression fitting is in tension. Therefore in some preferred examples the compression fitting is formed from circumferentially wound fibre-reinforced polymer. Such circumferential (hoop) fibre is strong in tension and therefore provides the required strength and biasing force while being lighter than a metal ring.

It will be appreciated that, if desired, compression fittings could be provided on both the inside and the outside of the joint. However, in preferred examples only one compression fitting is needed at each joint so as to minimise weight of the isolator.

The compression fitting may have a tapered surface arranged to mate with a tapered surface of the fluid-carrying member or the fibre-reinforced polymer tube such that axial movement of the compression fitting changes the biasing force of the first toothed surface and the first interface region. Such arrangements are convenient for applying a gradually increasing biasing force during application. As the tapered (i.e. wedge shaped) compression fitting is pushed (or pulled) axially into position, in line with the first toothed surface and the first interface region, the force applied to those surfaces is gradually increased until it reaches the desired level. The taper angle of the compression fitting may be selected according to the particular design, to take into account the amount of preload required and the rate of change of compression with axial movement. However, the angle should be shallow enough that the compression fitting is not at risk of being squeezed back out of position, i.e. it should be sufficiently frictionally engaged in its installed position that it will not move during use of the isolator. In some examples the taper is at an angle to the tube axis of no more than 20 degrees, preferably no more than 15 degrees, more preferably no more than 10 degrees, more preferably still no more than 7 degrees.

In some examples the first and second fluid-carrying members are metallic. In other examples they could be formed from fibre-reinforced polymer with a suitable construction for controlling their conductivity, e.g. via the addition of conductive additive so as to ensure that they can dissipate static electricity that could otherwise build up in use.

In some examples the electrical isolator further comprises a non-conductive separator arranged between the first and second fluid-carrying members. The non-conductive separator ensures that the required insulating gap is provided between the first and second fluid-carrying members. For example, in some applications, e.g. in aerospace hydraulic systems, a gap of 1.5 inches is typically required to ensure that the metal components will not conduct electricity across the isolator, e.g. during a lightning strike.

In some examples the electrical isolator further comprises a layer of sealant disposed between the first and second fluid-carrying members and the fibre-reinforced polymer tube. With adequate preload on the toothed surface and the interface region provided by the compression fitting, a good seal can be made at that interface. However, the addition of sealant can be a useful backup measure that provides additional sealing and thus quality assurance with minimal additional weight. The sealant can be an adhesive which sets after construction of the isolator and helps to hold the joint surfaces fixed in place. The sealant may be an elastomeric material. Alternatively, the sealant could be a resin such as the resin used as the matrix in the fibre-reinforced polymer tube. Such a resin can be fluid during construction and can set after construction (e.g. through a natural setting process or via a curing process).

In some examples the fibre-reinforced polymer tube is partially electrically conductive. Such partial conductivity is used to allow dissipation of static electricity as discussed above, while not providing a good enough conduction path to act as a primary conduction path in the event of a lightning strike. The conductivity of the tube must therefore be carefully controlled. This can be achieved by careful selection of the materials used in the fibre-reinforced polymer tube. In some examples the fibre-reinforced polymer tube comprises fibres disposed in a polymer matrix and the polymer matrix comprises a conductive additive. The conductive additive may be for example carbon black or carbon nanotubes. By carefully controlling the amount of additive in the resin, the conductivity of the fibre-reinforced polymer tube is controlled to the desired level.

According to another aspect of this disclosure there is provided a method of forming an electrical isolator, said method comprising: engaging a first toothed surface of a first fluid-carrying member with a first interface region of a fibre-reinforced polymer tube; engaging a second toothed surface of a second fluid-carrying member with a second interface region of said fibre-reinforced polymer tube; and applying a compression fitting to bias the first interface region and the first toothed surface together.

It will be appreciated that all of the preferred and optional features discussed above in relation to the apparatus also apply to the method of forming an electrical isolator.

The engagement of the fluid carrying members with the fibre-reinforced polymer tube may involve overlapping the two parts such that one lies inside the other and such that the surfaces (first toothed surface and first interface region, and correspondingly second toothed surface and second interface region) have an overlapping axial extent.

The compression fitting may be fitted in any suitable manner. However, in some examples it may be fitted by applying the compression fitting axially into position. When in position, the compression fitting may also axially overlap with the first toothed surface and the first interface region. Depending on the particular arrangement, the compression fitting may be applied in either axial direction. When the compression fitting is radially outside of the joint that it compresses, then the compression fitting may be applied from a position surrounding the first fluid-carrying member and applied in the direction of the end of that fluid-carrying member. When the compression fitting is radially inside of the joint that it compresses, then the compression fitting may be applied from a position in which it does not overlap with the first fluid-carrying member towards the position of overlap with the first fluid-carrying member. In this latter case, the compression fittings may be first located in a non-biasing position within the tube and then, after engagement of the first toothed surface of the first fluid-carrying member with the first interface region, the compression fitting can then be pressed into the engaged, biasing position. Where the compression fitting is tapered, it provides a steadily increasing biasing force as it moves axially into position.

One major advantage of the structure and assembly method discussed here is that prefabricated tubes of fibre-reinforced polymer can be used and simply cut to size as required. For example, filament wound shafts can be wound and cured as normal and then cut to size and a taper applied if required. This means that composite tubes do not need to be specifically made to the exact length required. Instead, composite tube can be produced in long lengths and later cut to size. The cut length of tube can then have the tapered interface region formed as required. Further, the angle of the taper need not be determined until the interface region is created, thus allowing a single tube fabrication process to be used flexibly for many different purposes. Therefore, in certain preferred examples, the tube is formed by cutting a length from a longer tube and subsequently forming the interface region adjacent to the cut. For example, the process allows stock lengths of tube to be manufactured without consideration of the size of the isolator to be formed.

BRIEF DESCRIPTION OF DRAWINGS

One or more non-limiting examples will now be described, by way of example only, and with reference to the accompanying figures in which.

DETAILED DESCRIPTION

Figure 1:
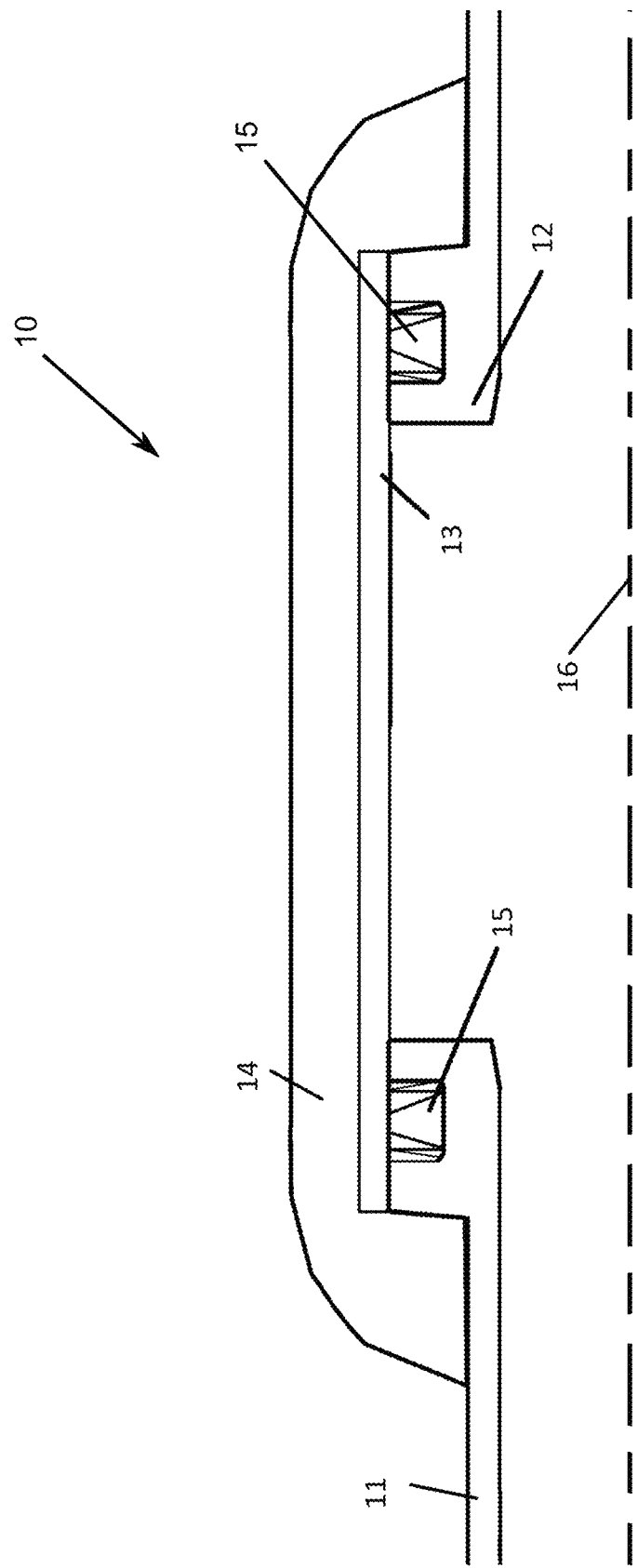
FIG. 1 shows an existing electrical isolator.

FIG. 1 shows an existing arrangement for an electrical isolator 10 in which a first pipe 11 (first fluid-carrying member) and second pipe 12 (second fluid carrying member) are spaced apart and electrically isolated from each other by a non-conductive liner tube 13. The liner tube 13 is mounted to the ends of each of the pipes 11, 12 by a complex multi-part seal 15 which ensures that the high pressure fluid from within the pipe does not leak. Such multi-part seals 15 are expensive. The whole structure is over-wound with fibre-reinforced polymer composite 14. Which holds the whole structure together, giving it stability and strength as well as providing a low conductivity path that connects the pipes 11, 12 to allow for static dissipation. FIG. 1 shows a cross-section through half of a pipe, with the axis 16 showing the pipe centreline. It will be appreciated that the structure is rotationally symmetric around the centreline 16.

Figure 2:
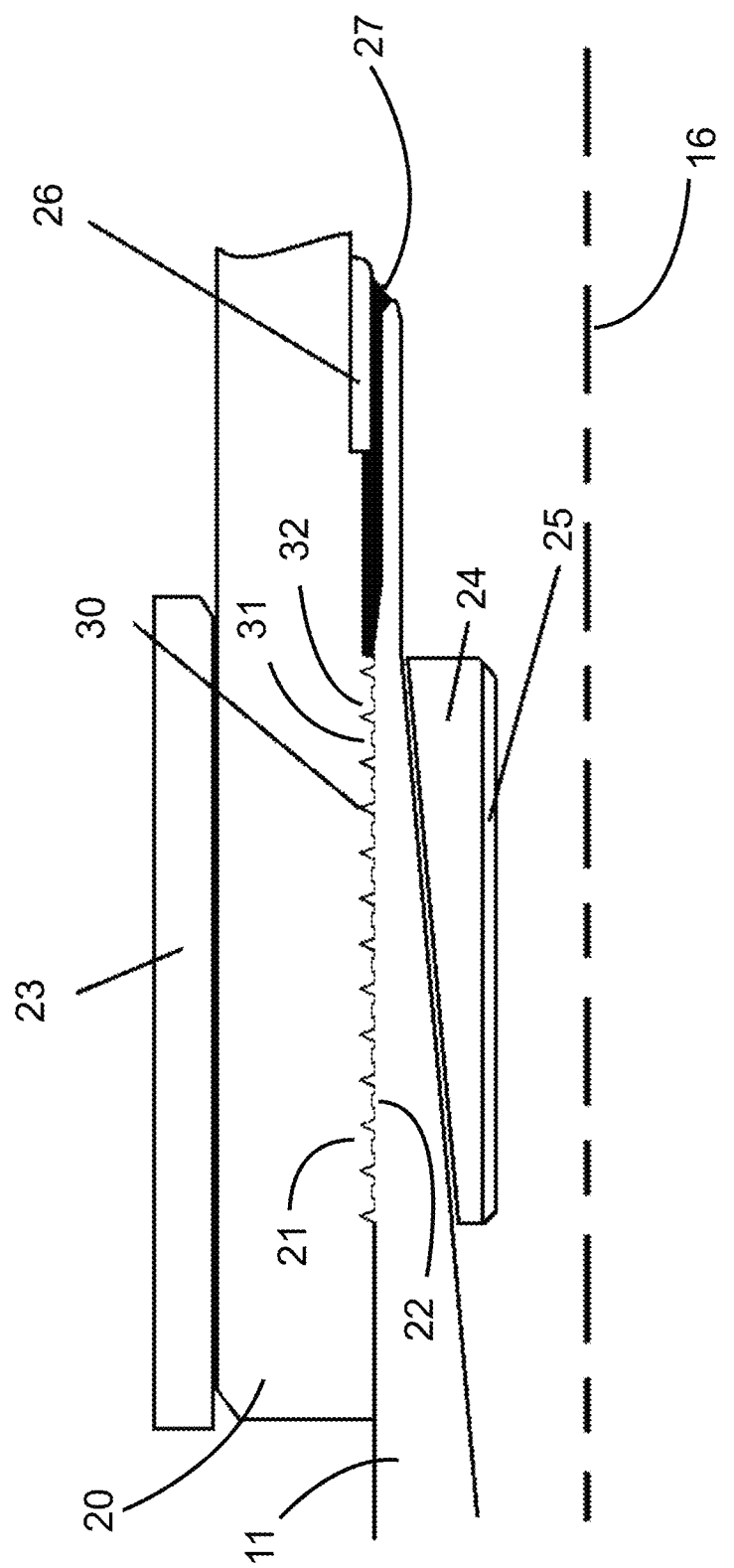
FIG. 2 shows an example of a hydraulic isolator.

FIG. 2 shows a first example of this disclosure. In FIG. 2 only one pipe 11 is shown together with the surrounding structure. However, it will be appreciated that this is only for convenience and the whole isolator does in fact consist of two such pipes 11, 12 as shown in FIG. 1, but with the structure shown in FIG. 2 replicated at the other pipe.

As is shown in FIG. 2, in this example the pipe 11 has an outer surface that is substantially parallel to the central axis 16. The pipe 11 has an inner surface that is tapered relative to the central axis 16 such that the thickness of the pipe 11 reduces towards its end. The outer surface of the pipe 11 comprises a toothed surface 22 in which is formed a helical thread. It will be appreciated that this could be a single start thread or a multi-start thread and the thread profile could be one of many different profiles. In this particular example the thread is a single start thread and the thread profile is formed so as to produce interspersed teeth 30 and flat seal lands 31. The teeth 30 serve to cut into and/or engage with the opposite surface 21 of the composite tube 20 and thereby provide axial load resistance. The seal lands 31 provide increased friction between the two parts 11, 20 and therefore when a suitable preload is applied, the added resistance from the seal lands 31 adds significantly to the axial load resistance.

The composite tube 20 (fibre-reinforced polymer tube) is pre-formed from a hollow tube of fibre-reinforced composite which is formed from fibres (e.g. carbon fibres or glass fibres) disposed in a matrix (e.g. an epoxy resin) with a conductive additive (e.g. carbon black or carbon nanotubes) in the matrix that is used to carefully control the electrical conductivity of the tube 20.

In order to bias the pipe 11 and the composite tube 20 together, two compression fittings 23, 24 are shown in FIG. 2. It will be appreciated that these can both be used together for maximum compression of the joint. However in many applications only one of these compression fittings 23, 24 is required and only one would be used in order to save weight. Both are shown here for convenience.

The outer compression fitting 23 is a ring mounted on the outer diameter of the composite tube 20 and is designed to have an interference fit therewith, i.e. the inner diameter of the compression fitting 23 is made slightly smaller than the outer diameter of the composite tube 20 such that when the fitting 23 is pressed into position as shown in FIG. 2, it biases the interface region 21 of composite tube 20 against the toothed surface 22 of pipe 11. This biasing increases the friction between these two surfaces 21, 22, thereby increasing the axial load resistance and effecting a good seal between the pipe 11 and the tube 20. In particular, with the tooth profile as shown in FIG. 2, the seal lands 31 provide a high contact area parallel to the two surfaces that increases the friction between them.

The inner compression fitting 24 in this example is a wedge shaped ring which is tapered on its outer surface such that it is wider at the end closest to the end of the pipe 11 and gets narrower away from that end. The tapered outer surface of the compression fitting 24 mates with a correspondingly tapered surface on the inner diameter of the pipe 11. These two mating surfaces have the same taper angle. As the inner compression fitting 24 is moved axially away from the joint (to the left in FIG. 2), the two tapered surfaces engage more firmly, increasing the compression force that biases the toothed surface 22 of the pipe 11 against the interface region 21 of the composite tube 20. In other examples the inner compression fitting 24 may not be wedge shaped, but instead be cylindrical like the compression fitting 23. The compression fitting 24 may have a thread 25 on its inner diameter that can be used to push or pull the compression fitting 24 into position when required to effect the seal. To do so, a threaded tool can be inserted in through the pipe 11 (or through the pipe 12), threaded into the thread 25 so as to engage the fitting 24 and can then be used to move the fitting 24 into the desired position. The tool can then be unscrewed and removed, leaving the fitting 24 in place.

The compression fittings 23, 24 may be formed from metal for high stiffness and strength. However they could alternatively be made of other materials. In particular, the outer compression fitting 23 could be made from hoop wound (circumferentially wound) fibre-reinforced polymer as this is lighter in weight while still having the required strength to provide the required compression.

Two further optional features are shown in FIG. 2. Firstly, a non-conductive liner 26 is shown overlapping the end of the pipe 11 and lying radially outside the pipe 11. The liner 26 is made from a non-conductive material such as PEEK (polyether ether ketone) or glass fibre-reinforced polymer (without any conductive additive in the resin). The liner 26 can be used to ensure the electrical separation of the two pipes 11, 12 in accordance with regulations. However, in many cases the composite tube 20 can itself ensure the required separation and therefore the liner 26 is not essential. A further possible benefit of the liner 26 is that the composite tube 20 could be wound in place onto the pipes 11, 12 and then cured. In such cases the fibre would need a surface to be wound on before curing has taken place. The liner 26 provides such a surface across the gap between the two pipes 11, 12. However, it will be appreciated that in examples in which the composite tube 20 is pre-formed (and cured) into a hollow tube which is then cut to size and then mated with the pipes 11, 12, there will potentially be no need for the liner 26.

Secondly, a sealant 27 is shown at the end of the pipe 11, located radially between the pipe 11 and the composite tube 20. The sealant 27 is not essential as an adequate seal is provided by sufficient compression of the toothed surface 22 and the interface region 21. However, the sealant 27 adds little extra cost and weight and provides an extra quality assurance that a good seal will be formed and maintained throughout the life of the product. The sealant 27 may be any suitable type of sealant such as those already used in hydraulic or fuel systems. The sealant may also act as an adhesive, holding the two parts 11, 20 firmly together. The sealant 27 may also, as shown in FIG. 2, contact and seal against the liner 26 if present.

Figure 3:
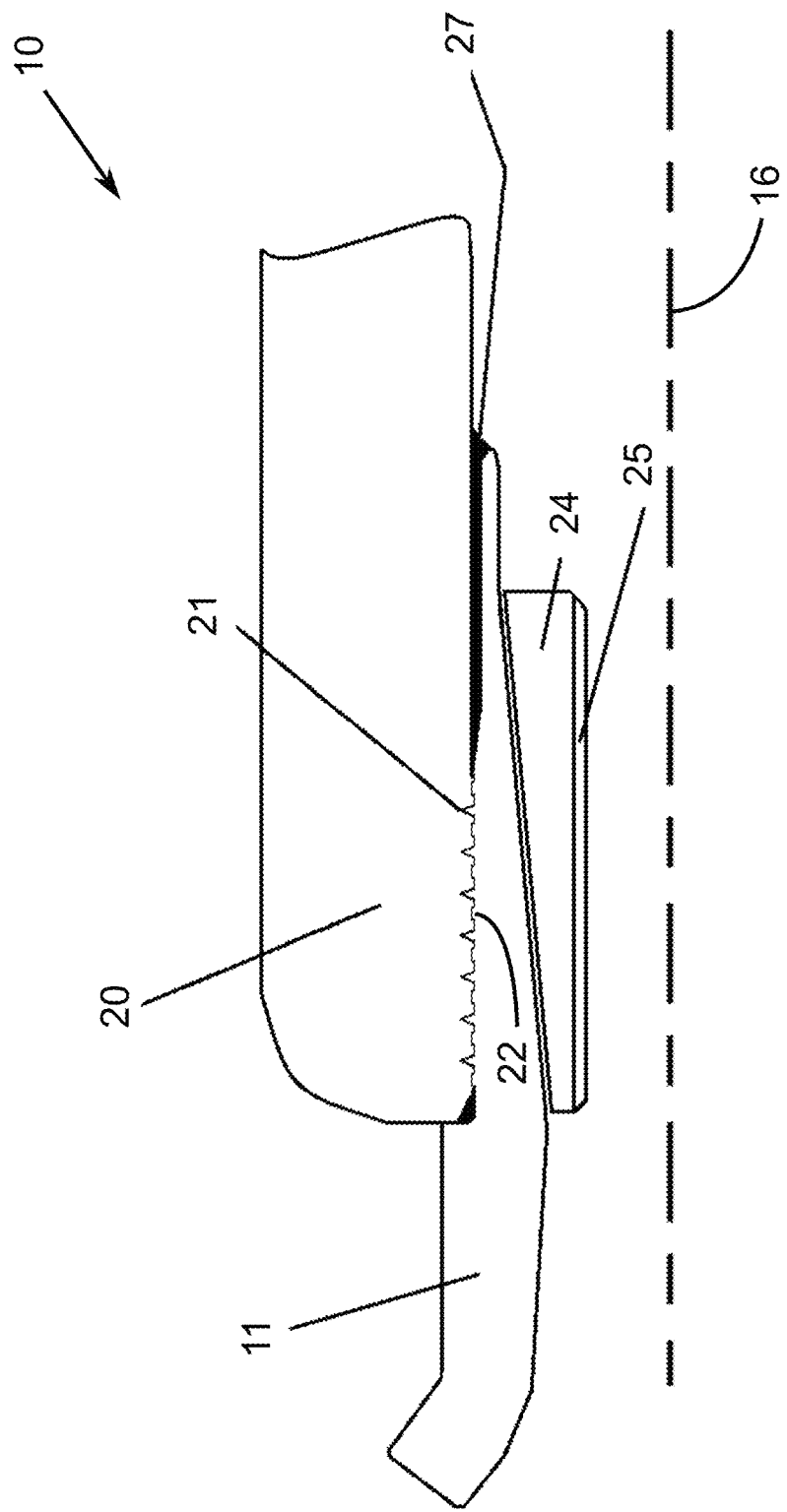
FIG. 3 shows another example of an isolator with only an inner compression fitting.

FIG. 3 shows a second example electrical isolator 10. This example shares many features with the example of FIG. 2. However, in this example, only an inner compression fitting 24 is shown, i.e. there is no outer compression fitting in this example. Further, the non-conductive liner 26 is not present in this example.

Figure 4:
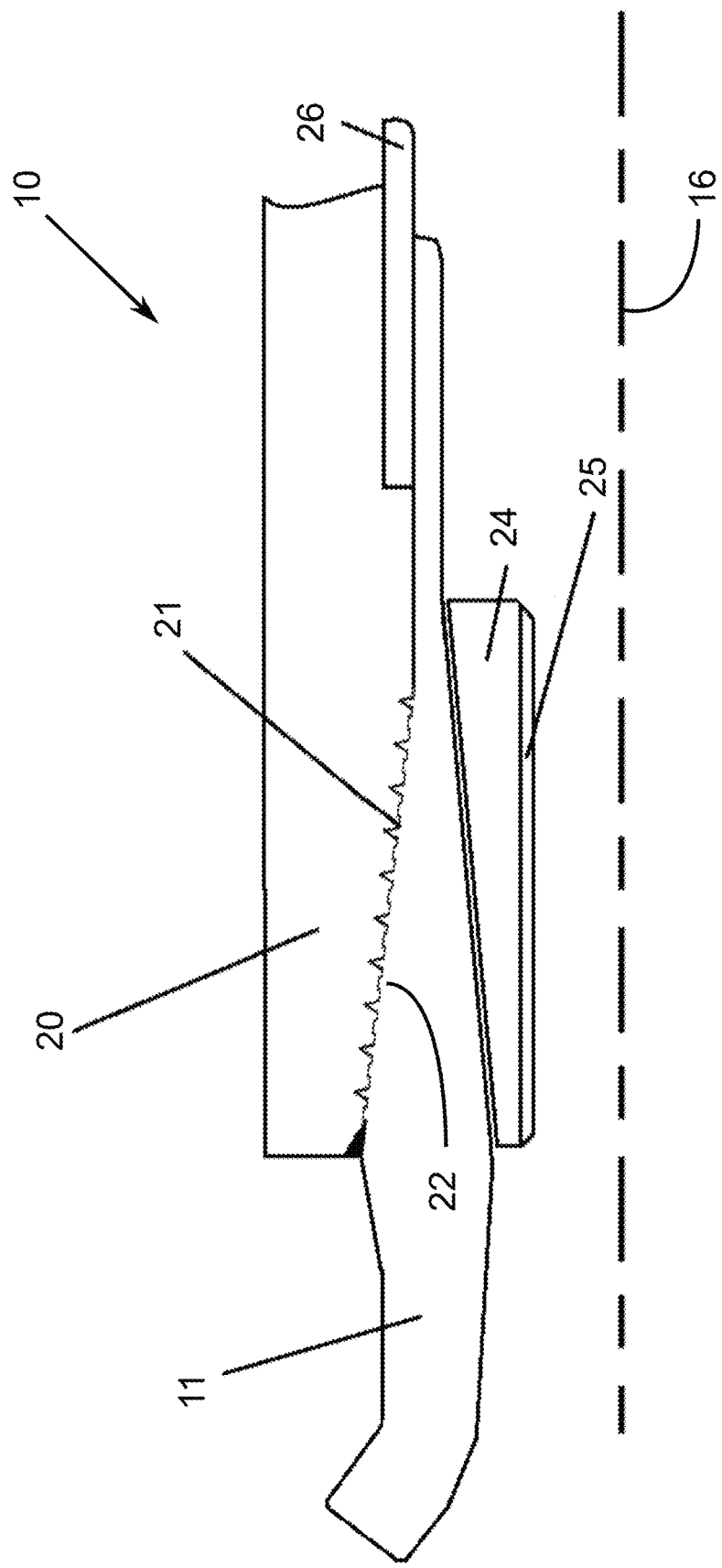
FIG. 4 shows another example of an isolator with a tapered interface region.

FIG. 4 shows a third example electrical isolator 10. This example also shares many features with the examples of FIGS. 2 and 3. Like FIG. 3, there is no outer compression fitting 23, only an inner, tapered compression fitting 24. In this example the liner 26 is present, but there is no additional sealant added to the joint. However, in this example, the main difference is that the toothed surface 22 of the pipe 11 and the interface region 21 of the composite tube 20 are not parallel to the tube axis 16, but rather are tapered at an angle with respect to that axis 16. The tapering of this interface has the advantage that the engagement of the toothed surface 22 and the interface region 21 is distributed across the radial thickness of the tube 20 rather than all being at the outer diameter thereof. This distribution of the interface ensures that the load is transferred through a greater number of fibres in the tube 20. The tube 20 is typically built up from several layers of fibres, each layer lying over the top of the previous layer. Thus, engaging across a greater thickness of the tube 20 ensures engagement with a greater number of layers and a greater number of fibres, thus distributing the load more evenly through the composite tube and thus reducing the mechanical requirements of the tube 20 (which may in turn allow the tube 20 to be reduced in thickness, thus saving weight).

Figure 5:
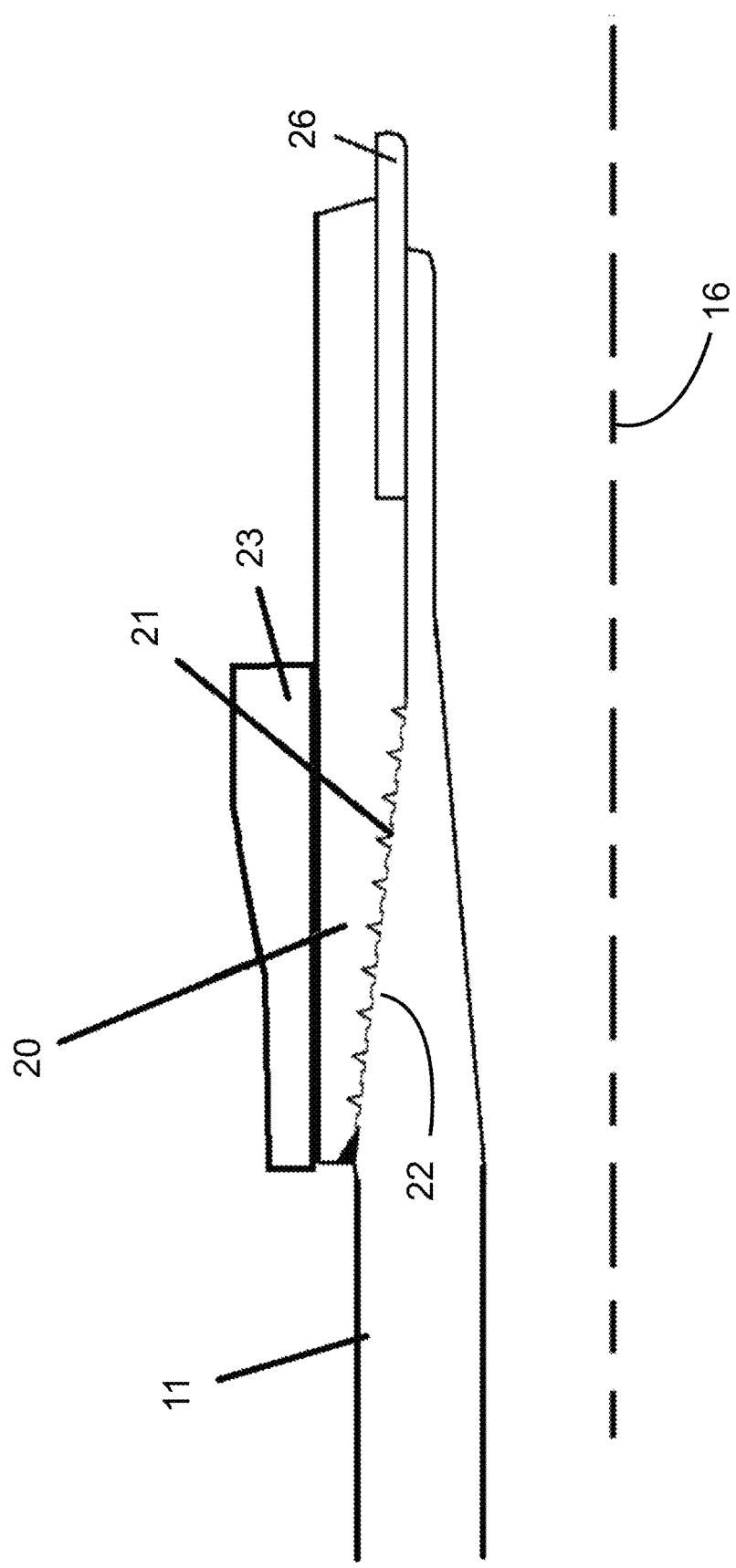
FIG. 5 shows another example of an isolator with an outer compression fitting.

FIG. 5 is the same as FIG. 4 except that the wedge shaped inner compression fitting 24 has been replaced with an outer compression fitting 23. The compression fitting 23 is shaped in this example to be tapered from a radially thinner end to a radially thicker end. The taper of the compression fitting 23 is opposite to that of the interface region 21 and toothed surface 22 such that the thicker end is closer to the end of the pipe 11. This ensures the greatest compression force at the innermost end of the seal where pressure is greatest, while allowing the compression fitting 23 to be thinner at the outermost end of the seal where pressure will be reduced. This variation of thickness allows an overall reduction in weight of the compression fitting 23. This benefit also applies to the wedge shaped inner compression fitting 24 described above.

It may be noted that in any of the examples described here, the outer surface of the composite tube 20 need not be parallel to the axis 16 and can instead have a profile that is optimised for weight, pressure or interference fit on the thread.

Figure 6:
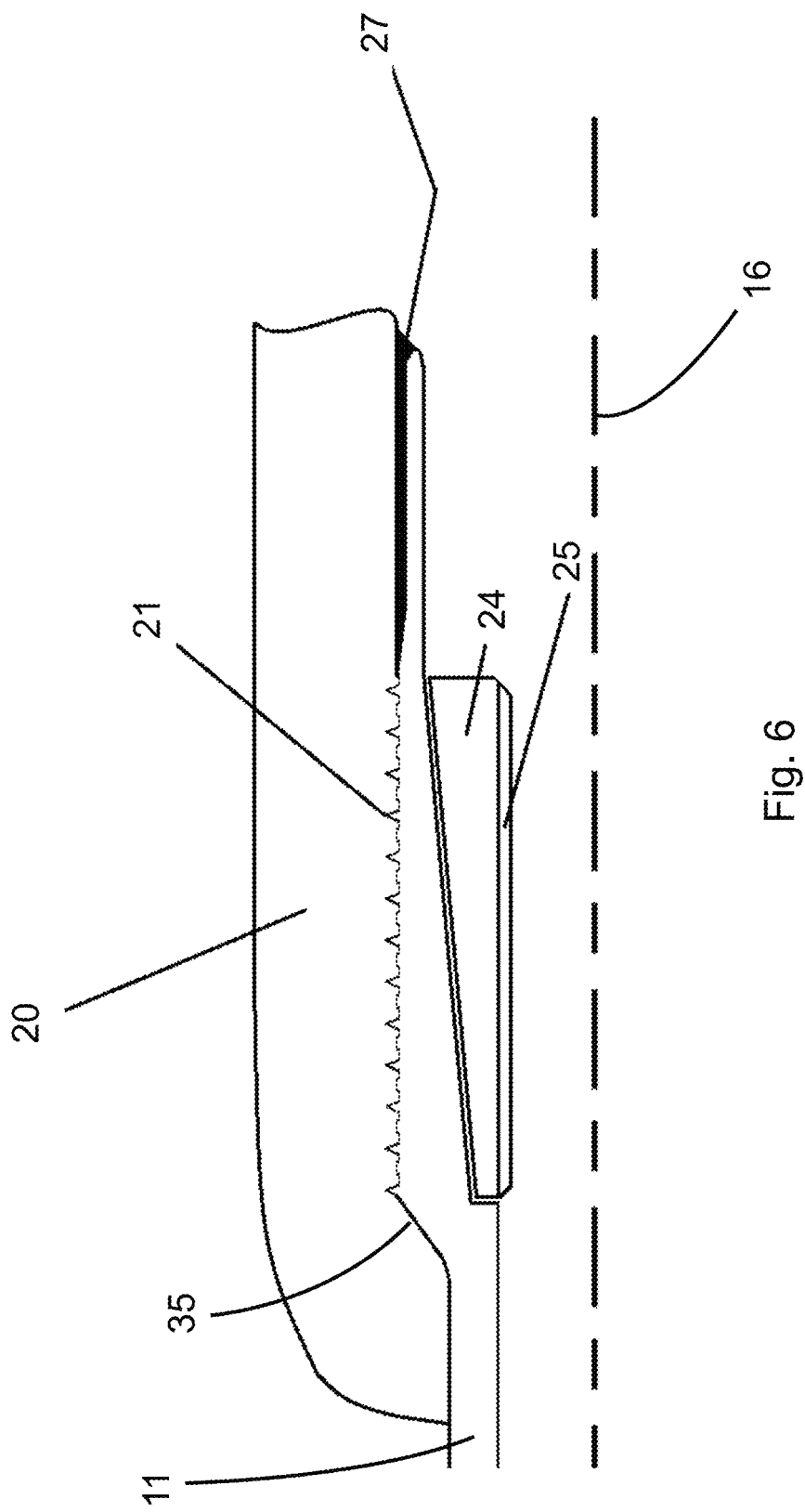
FIG. 6 shows another example of an isolator with a recessed inner compression fitting.

FIG. 6 also shares many features with FIG. 2. The main differences are that no outer compression fitting 23 is provided. The wedge shaped inner compression fitting 24 is provided as in FIG. 2, but the pipe 11 has a profile on its inner surface that is designed to accept the wedge shaped compression fitting 24 such that when it is in the fully installed position, the inner surface of the fitting 24 is flush with the inner surface of the pipe 11. This reduces turbulence in the flow within the pipe. It may be noted that in this example the threaded part 25 of the compression fitting 24 extends radially inwardly of the recess in pipe 11 so that the fitting 24 could be pulled by a threaded tool inserted through pipe 11. In other examples the threaded part 25 could also be accommodated in the recess. Finally, the composite tube 20 in FIG. 5 can be seen to extend over a raised shoulder 35 of the pipe 11, thus holding the pipe 11 securely in place. To form this structure, the composite tube 20 must be wound in situ rather than pre-formed as a pre-cured hollow tube that is simply cut down to size. If required, a liner 26 (not shown in FIG. 6) may be provided in order to provide a supporting surface on which to wind the composite tube 20. A sacrificial (e.g. dissolvable) liner may used that may later be removed if desired.

The invention claimed is:

1. An electrical isolator comprising:
a first fluid-carrying member and a second fluid-carrying member spaced apart from said first fluid-carrying member;
wherein said first fluid-carrying member has a first toothed surface and said second fluid-carrying member has a second toothed surface;
wherein the electrical isolator further comprises:
a fibre-reinforced polymer tube that overlaps both the first fluid-carrying member and the second fluid-carrying member and which contacts the first toothed surface in a first interface region of the fibre-reinforced polymer tube and which contacts the second toothed surface in a second interface region of the fibre-reinforced polymer tube; and
a compression fitting arranged to bias the first interface region and the first toothed surface together.

2. The electrical isolator as claimed in claim 1, wherein the compression fitting is a first compression fitting and wherein the electrical isolator further comprises a second compression fitting arranged to bias the second interface region and the second toothed surface together.

3. The electrical isolator as claimed in claim 1, wherein at least one of the first toothed surface and the second toothed surface is threaded.

4. The electrical isolator as claimed in claim 1, wherein at least one of the first toothed surface and the first interface region are tapered or the second toothed surface and the second interface region are tapered.

5. The electrical isolator as claimed in claim 1, wherein the compression fitting is located radially inwardly of the first toothed surface.

6. The electrical isolator as claimed in claim 5, wherein the compression fitting is a hollow cylinder arranged such that, when installed, its inner diameter is flush with the inner diameter of the first fluid-carrying member.

7. The electrical isolator as claimed in claim 1, wherein the compression fitting is located radially outwardly of the first toothed surface.

8. The electrical isolator as claimed in claim 7, wherein the compression fitting is formed from circumferentially wound fibre-reinforced polymer.

9. The electrical isolator as claimed in claim 1, wherein the compression fitting has a tapered surface arranged to mate with a tapered surface of the fluid-carrying member or the fibre-reinforced polymer tube such that axial movement of the compression fitting changes the biasing force of the first toothed surface and the first interface region.

10. The electrical isolator as claimed in claim 1, wherein the first and second fluid-carrying members are metallic.

11. An electrical isolator as claimed in claim 1, further comprising a non-conductive separator arranged between the first and second fluid-carrying members.

12. The electrical isolator as claimed in claim 1, further comprising a layer of sealant disposed between the first and second fluid-carrying members and the fibre-reinforced polymer tube.

13. The electrical isolator as claimed in claim 1, wherein the fibre-reinforced polymer tube is partially electrically conductive.

14. The electrical isolator as claimed in claim 13, wherein the fibre-reinforced polymer tube comprises fibres disposed in a polymer matrix and wherein the polymer matrix comprises a conductive additive.

15. A method of forming an electrical isolator, said method comprising:
- engaging a first toothed surface of a first fluid-carrying member with a first interface region of a fibre-reinforced polymer tube;
- engaging a second toothed surface of a second fluid-carrying member with a second interface region of said fibre-reinforced polymer tube; and
- applying a compression fitting to bias the first interface region and the first toothed surface together.

* * * * *